June 30, 1953   J. N. WILLIAMS   2,643,578
STEREOSCOPIC VIEWING DEVICE
Filed June 19, 1951   2 Sheets-Sheet 1
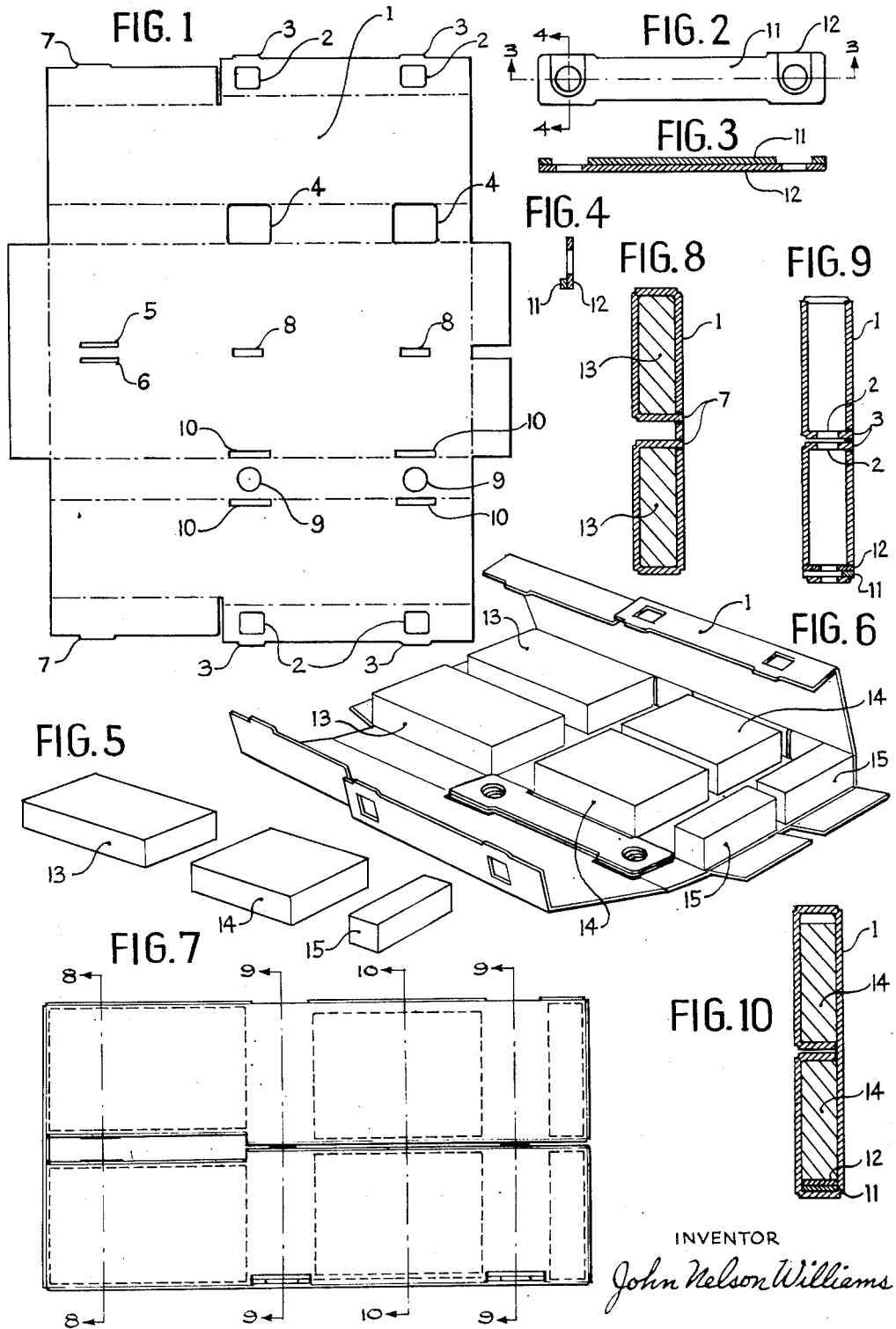
INVENTOR
John Nelson Williams

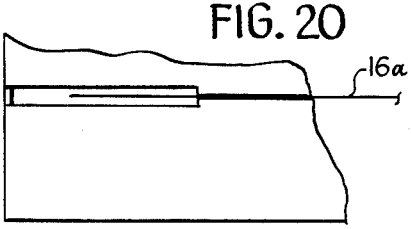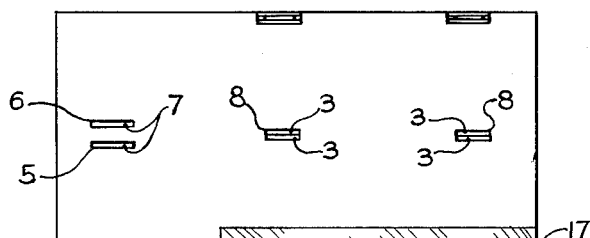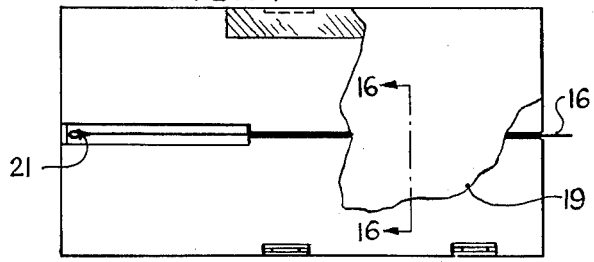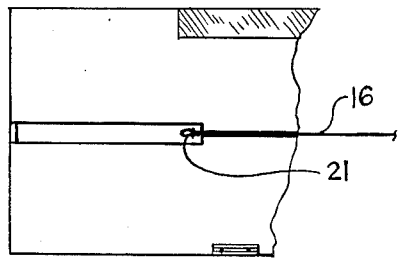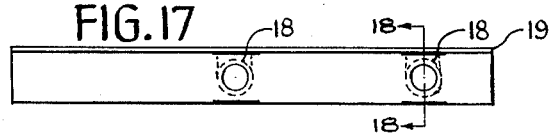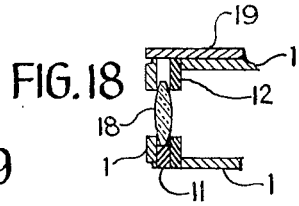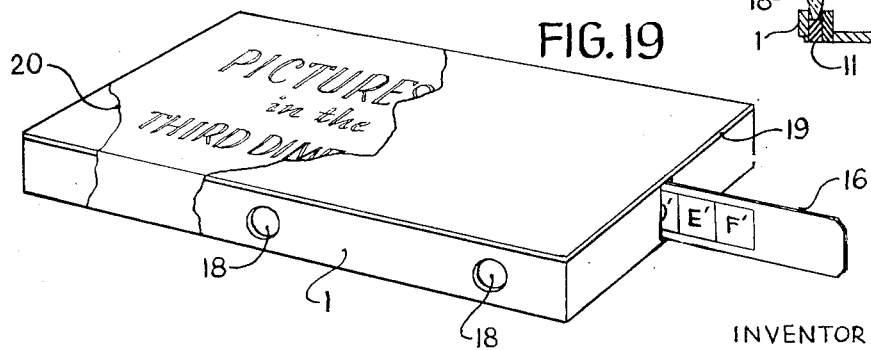

Patented June 30, 1953

2,643,578

UNITED STATES PATENT OFFICE 2,643,578

STEREOSCOPIC VIEWING DEVICE

John Nelson Williams, New York, N. Y.

Application June 19, 1951, Serial No. 232,264

5 Claims. (Cl. 88—31)

This invention relates to a device for viewing stereoscopic pictures.

The main object of this invention is to construct a stereoscopic viewing device from flat sheets of inexpensive cardboard which is die-cut and scored then bent into a box-shaped structure.

The second object is to provide a viewing device containing box-shaped spacer elements within said cardboard device, such spacer elements providing rigidity and resistance to torsional deflection necessary for a well constructed stereoscopic viewer.

The third object is to mount a continuous strip of transparency film bearing stereoscopic images within the device in a permanent assembly and in such manner as to allow the film to be manually moved back and forth within the device and present a series of stereoscopic pictures viewed through the lenses of the device, a stereoscopic image being viewable at all times no matter in which position the film is moved.

The fourth object is to provide a device of the class described wherein is included means for automatically stopping the movement of the film in either direction.

The fifth object is to assemble a cardboard lens mount which is then permanently attached to the device and which contains means to allow the two optical lenses to be slid into said mounts when the main structure of the device is in an advanced state of assembly.

The sixth object is to provide a device of the class described whereby the film strip contains no stopping means and a number of film strips may be successively inserted into an open slot at one end of the device, the stereoscopic pictures on said film strip viewed by slowly pulling film strip outward, then said film strip completely withdrawn and another film strip inserted for viewing in like manner.

The seventh object is to provide such a device which contains a channel at right-angles to the two viewing apertures, said channel being enclosed at the top, bottom and sides so as to mount in slidable action therein a strip of transparency film bearing a series of stereoscopic images thereon, and in particular a channel as described which has one end closed and the other end open, so that the film strip, whether mounted permanently within or inserted from the outside of said device, may be manually pushed to contact the closed end of the channel and thus bring the first picture into position for stereoscopic viewing, the remaining pictures being viewed by moving said film strip outwardly from the device.

These and other objects are accomplished in the manner set forth in the following specification, and as illustrated in the accompanying drawings, in which:

Fig. 1 is a plan view of the flat pattern which is die-cut and scored from a flat sheet of cardboard and which is bent to form the basic box-shaped structure of the device.

Fig. 2 is a plan view of the lens mount which is assembled from two flat pieces of die-cut cardboard.

Fig. 3 is a section taken along the line 3—3 in Fig. 2.

Fig. 4 is a section taken along the line 4—4 in Fig. 2.

Fig. 5 is a perspective view of the three spacer elements, two of each being required for assembly of the device.

Fig. 6 is a perspective view illustrating the first steps in the assembly of the device, wherein the spacer elements have been bonded to one side of the body structure and the lens mount has been permanently bonded to said structure.

Fig. 7 is a plan view wherein assembly of the body structure with the spacer elements and lens mount has been completed.

Fig. 8 is a section taken along the line 8—8 in Fig. 7.

Fig. 9 is a section taken along the line 9—9 in Fig. 7.

Fig. 10 is a section taken along the line 10—10 in Fig. 7.

Fig. 11 is a front elevation of a strip of transparency film on which is photographed two successive series of pictures which combine to form stereoscopic images when viewed through the two lenses of the device, and having one embodiment of movement stopping means attached to one end of said film strip.

Fig. 12 is a plan view of the bottom of the device in a state of assembly as shown in Fig. 7 with a translucent material bonded to cover the two window openings, and clearly showing the positioning slots in the center area of the bottom of the device which accurately position the film enclosing channels.

Fig. 13 is an end view of Fig. 12.

Fig. 14 is a plan view again showing the top of the device wherein the film strip as shown in Fig. 11 has been permanently mounted, the two lenses have been inserted into the lens mount and a flat rectangular cardboard shown here in a partial view has been bonded to the top of the device.

Fig. 15 is a view identical to Fig. 14 except that the film strip is here shown in its farthermost sliding position from that shown in Fig. 14 and has been stopped in its movement by the design of the narrower film-enclosing channel which prevents passage of the movement stopping means at the end of said film strip.

Fig. 16 is a partial sectional view taken along the line 16—16 in Fig. 14 and more clearly illustrates the channel through which the film strip is moved in sliding action.

Fig. 17 is an end view of Fig. 14.

Fig. 18 is a partial sectional view taken along the line 18—18 in Fig. 17 and illustrates the manner in which the lenses are inserted into the already assembled lens mount and are held in position by slight pressure against the cardboard parts comprising said lens mount and permanently enclosed at the top by bonding of the rectangular cardboard top to the device.

Fig. 19 is a perspective view of the completely assembled stereoscopic viewing device in which the film strip has been moved partially outward and in which a cover paper has been bonded over the outer surface of the device.

Fig. 20 is a partial plan view similar to Fig. 15 in which the movement stopping means has been eliminated from the end of the film strip.

Similar numerals refer to similar parts throughout the several views.

The present invention includes features which are a distinct improvement over devices of the same type in prior art, particularly in regard to the design of a very efficient and practical stereoscopic viewing device which can be manufactured at a very low price thus allowing stereoscopic pictures to be shown at a very low price for entertainment and educational purposes. This is accomplished in the present invention by providing a rigid cardboard structure containing a straight channel at right angles to the two viewing apertures, the channel being enclosed on four sides and at one end and having the other end open to allow either insertion and/or movement of a transparency film strip within the channel and moving past the two viewing apertures to show a succession of stereoscopic pictures contained on the film. A novel and unique feature of the device is that the series of stereoscopic pictures are placed on the film in successive position, all of the pictures to be viewed through the left lens aperture being in successive position, followed by a succession of all the pictures to be viewed through the right lens aperture. In the present invention the viewing device is so constructed that said straight channel within which the film strip is mounted extends beyond and to the left of the left lens aperture a distance approximately equal to the distance between two said lens apertures, in such manner that when the film strip is either inserted into or is mounted permanently within said channel and is pushed to the extreme left side of said channel it comes into contact with the closed end of said channel and in this position the first of the series of stereoscopic pictures is in position to be viewed. The film strip is then pulled to the right bringing each succeeding stereoscopic picture into view through the two lens apertures. Automatic stopping means are provided to stop this outward movement of the film strip when the last stereoscopic picture is in viewing position. If this stopping means is eliminated, the film strip is then completely withdrawn from the viewing device and a film strip with different pictures is inserted for viewing in the same manner. The closed end of the aforementioned channel thus acts as a positive positioning means for viewing the first of the series of pictures, the other pictures automatically following in proper order.

Referring in detail to the drawings, the die-cut cardboard sheet 1, as shown in Fig. 1, contains four picture apertures 2, two picture windows 4, two lens apertures 9, four protruding ridges 3 designed to fit into the two slots 8 and also four slots 10 designed to position the lens mount shown in Fig. 2. All of these parts 2, 3, 4, 8, 9 and 10 are in parallel alignment and remain so through the final assembly of the device. When the device is assembled parts 2, 4 and 9 are also in optical alignment. Protruding ridges 7 are designed to fit into slots 5 and 6 to form a wider film-enclosing channel than is formed by mating of ridges 3 into slots 8. As shown in Fig. 1, the die-cut cardboard part 1 has been scored on the reverse side so that the cardboard will be bent upward for assembly as shown in Fig. 6.

Spacer elements 13, 14 and 15 may be made in the form of closed cardboard boxes which are folded together from flat pieces of die-cut and scored cardboard, from laminated cardboard, from solid pieces of light wood or other suitable material. When assembled by bonding to the die-cut cardboard 1, their purpose is that of forming two dark tunnels through which are visually aligned lens apertures 9, picture apertures 2 and picture windows 4, and in addition these spacer elements give rigidity to the assembled viewing device and enable it to successfully resist torsional deflection when said device is held in the hands for viewing, torsional deflection which would tend to throw the pair of stereoscopic pictures out of alignment so that they could not be visually fused into one stereoscopic picture.

The lens mount is assembled by bonding the two die-cut cardboard parts 11 and 12 together as shown in Figs. 2, 3 and 4. Part 11 contains two semi-circular cut-outs with open ends which are the same dimension as the diameter of the lenses to be mounted therein. Part 12 has two circular cut-outs smaller in diameter than the lenses and of the same diameter as the two circular cut-outs 9 in part 1. After parts 11 and 12 are bonded together, the unit is then bonded to part 1, the face of part 11 abutting the inner face of part 1 and cut-outs 9 being aligned with the corresponding circular cut-outs in part 12. The protruding ridges above and below each cut-out of parts 11 and 12 are designed to be nested into the four slots 10 when part 1 has been bent over and bonded in an assembled state to spacer elements 13, 14 and 15. The position of the lens mount when bonded to part 1 is more clearly shown in Fig. 6.

In Fig. 7, part 1 has been bonded to spacer elements 13, 14 and 15 and to the lens mount. Protruding ridges 3 are nested into slots 8 and ridges 7 are nested into slots 5 and 6. The left end panel has been bonded to the wall of spacer elements 13 and the right end panels of part 1 have been bonded to the walls of spacer elements 15. Fig. 8 illustrates the nesting of ridges 7 into slots 5 and 6, Fig. 9 illustrates the lens mount bonded to part 1 and the nesting of ridges 3 into slots 8, Fig. 10 illustrates the rigid structure thus obtained and the accurate and exact positioning of the film enclosing channel formed by the two parts containing picture apertures 2.

As will be noted, the bonding of the different parts of the device at this point of the assembly have been performed without mounting of either the film strip or the optical lenses, thus allowing greater freedom in such bonding operations without fear of having the adhesive agent touch either the film or the lenses and damage them.

Film strip 16, as shown in Fig. 11, is a continuous strip of transparency color film, preferably standard 16 millimeter motion picture film, having a series of pictures A, B, C, D, E and F followed by a succeeding series of pictures A', B', C', D', E', and F', wherein A and A' combine to form a composite view necessary to form a stereoscopic picture, and B and B' combine to form one picture, et cetera. It is desirable to have the separation of the two series of pictures, such as A and A', approximately the width of the average eyes apart, or approximately 63 millimeters. A portion of the film on the left side is left unexposed and this portion of the film part 21 has movement stopping means attached thereto, the embodiment here illustrated being in the form of a staple, said stopping means limiting the movement of the film strip when said film strip is mounted within the viewing device. An unexposed portion of film is left on the right hand side in order to extend outside the viewing device so that the film may be grasped for manual movement within the viewing device. As will be apparent, various other means may be employed in place of staples for such movement stopping means, such as metal clips, plastic parts bonded thereto, etc.

Fig. 12 is an illustration of the bottom view of the device before the final assembly stages and shows more clearly the nesting of protruding ridges 3 into slots 8 and ridges 7 into slots 5 and 6. Part 17 is a rectangularly shaped piece of translucent paper or plastic which is bonded to the device so as to completely cover picture windows 4, as further illustrated in Fig. 13.

The final steps in the assembly of the viewing device are illustrated in Fig. 14. Film strip 16 is pressed into the film enclosing channel, the stapled end part 21 of the film strip being set into the wider channel and the remainder of the film running through the narrow channel. Optical lenses 18 are pressed into the two corresponding grooves of the lens mount, said grooves formed by the cut-outs in part 11 and now permanently bonded between parts 1 and 12, as is more clearly shown in Fig. 18.

Film strip 16 is shown in Fig. 14 in its farthermost position within the viewing device, and in this position the first stereoscopic picture composed of the two pictures A and A' is in position to be viewed through the two lenses 18 by light transmitted through picture windows 4 covered by translucent material 17, the two pictures composing the stereoscopic image being framed by picture apertures 2. By manually pulling the film strip out from the viewing device, the succeeding series of pictures are brought into view in succession until the last stereoscopic picture, composed of pictures F and F', is brought into view. At this point the stapled end part 21 of the film strip is brought into contact with the edges of the narrower part of the film enclosing channel and prevents further outward movement of the film strip, as is clearly depicted in Fig. 15. In movement, the bottom edge of the film strip slides along the flat surface of part 1 and the two surfaces of the film strip are encompassed by the two panels of part 1 which bear picture apertures 2. In order to completely enclose the film and guide the top edge of the film strip in its movement through the device, a flat rectangular cardboard part 19 is next bonded to the entire top surface of the viewing device, thus completely enclosing the two film strip channels and forming a cover over the grooves of the lens mount into which the lenses 18 have been pressed. Such cover part 19 is clearly illustrated in Figs. 14, 17, 18 and 19.

The complete stereoscopic viewing device is shown in perspective in Fig. 19, wherein film strip 16 has been pulled outward and the first few stereoscopic pictures have been viewed. For a more attractive appearance, printed cover paper 20 is bonded over the entire outer surface of the film viewing device, said cover paper 20 containing matching cut-outs for the two lenses 18, picture windows 4 and the right-hand slot through which the film strip is moved in and out of the body of the viewing device.

In the completely assembled state of the viewing device the different stereoscopic pictures on the film strip are viewed through two completely black tunnels with the light showing only through the transparency color pictures which comprise each stereoscopic picture. The two forms bearing picture apertures 2 which are bent over to form an enclosing channel for the film strip 16 would allow a slit of light to show at the bottom of their abutting juncture with the bottom panel of part 1 except for the unique construction of the device wherein protruding ridges 3 nest into slots 8 in such manner as to block out any light which might thus show were such construction not employed, and thus providing the two black tunnels for picture viewing which is the ideal condition for making more realistic the third-dimensional pictures being viewed.

In Fig. 20, the movement stopping means 21 has been eliminated from the film strip, said film strip being here shown as part 16a. Film strip 16a, which is otherwise identical to film strip 16, may thus be inserted into the slot at the right hand of the finished viewing device as shown in Fig. 19, said film strip 16a being manually pushed until it abuts the closed end of the shorter wider channel at which time the first of the stereoscopic pictures is in position to be viewed, 16a may then be pulled outwardly from the device to the right and the stereoscopic pictures thereon viewed in succeeding order, the film strip finally being pulled completely out of the viewing device, another film strip of the same type but with different pictures may then be inserted into the viewing device and the pictures thereon viewed in the same manner. In this way any number of similar film strips may be inserted into the viewing device in succession for viewing of the stereoscopic pictures contained thereon.

Although I have shown and described certain specific embodiments of the invention, I am fully aware that many modifications thereof are possible. My invention, therefore, is not to be restricted except insofar as is necessitated by the scope of the appended claims.

Having thus described my invention what I claim and desire to be secured by Letters Patent of the United States is:

1. In combination, a stereoscope having two viewing tunnels, lenses mounted in one of the ends of each thereof, translucent windows mounted in the other two ends in line with said lenses, a channel running longitudinally through said stereoscope at right angles to said viewing tunnels, said channel being enclosed at the top, bottom and sides and having one end closed and the other end open, a transparency film strip mounted within said channel, said film strip bearing a series of stereoscopic pictures thereon in successive position, the pictures to be viewed by the left eye being in one continuous series, followed by the pictures to be viewed by the right eye in one continuous series, said film strip when manually pushed to the farthermost point within the channel of said stereoscope being stopped by the closed end of said channel, whereby the first stereoscopic picture is in position to be viewed through said two visual apertures, said film strip then moved outwardly through said channel whereby each following stereoscopic picture is viewed, means provided on the inner end of said film strip whereby said film strip is finally and positively stopped in its outward movement when the last of said series of stereoscopic pictures is in position to be viewed, said means on the inner end of said film strip acting to prevent said film strip from being pulled out of said channel.

2. In a stereoscopic viewing device a rectangular box-shaped structure formed from a flat sheet of die-cut cardboard foldable into said box-shaped structure, rigid spacer elements bonded to said cardboard structure in such position as to add rigidity to and form two viewing tunnels within said structure, slotted means for engaging ridges formed on folding panels of said foldable cardboard structure to position said folding panels in such manner as to form a long narrow channel and a shorter wider channel running longitudinally and consecutively through the center of said structure and at right angles to said viewing tunnels, two lens apertures, four picture apertures and two window apertures provided in said structure and registering in a line of sight in folded position through the aforementioned two viewing tunnels, one side of said structure foldable to enclose and abut said shorter wider channel and the other side foldable to form an aligning slot with the outer end of said long narrow channel.

3. In a stereoscopic viewing device, a rectangular box-shaped structure formed from a flat sheet of die-cut cardboard foldable into said box shape, rigid spacer elements bonded to said cardboard structure in such position as to form two viewing tunnels therein, slotted means for engaging ridges formed on folding panels of said foldable cardboard shape to position said folding panels so as to form a long narrow channel and a shorter wider channel running longitudinally and consecutively through the center of said box shape and at right angles to said two viewing tunnels, two lens apertures, four picture apertures and two window apertures provided in said cardboard shape and registering in a line of sight in folded position through the two aforementioned viewing tunnels, one side of said structure foldable to enclose and abut said shorter wider channel and the other side foldable to form an aligning slot with the outer end of said long narrow channel, a translucent material bonded to cover said picture windows, a lens mount of two cardboard parts bonded to inside surface of and aligned with the lens apertures so as to form a grooved seat into which the two lenses are pressed, a transparency film strip bearing two successive series of pictures which combine to form stereoscopic images when viewed through said lenses, said film strip having movement stopping means attached to one end thereof, said film strip seated within two said channels, the end of the film strip with movement stopping means being seated in the shorter wider channel and the remainder of the film strip seated in the long narrow channel which allows passage of said film strip therein but not of the movement stopping means attached thereto, movement of said film strip thereby being stopped when said movement stopping means is brought into contact with the end of said long narrow channel, a separate rectangular cardboard cover bonded to the top of said cardboard structure to completely enclose the device.

4. A stereoscopic viewing device according to claim 3 to which is bonded over the entire outer surface a printed cover paper, said cover paper containing matching cut-outs to coincide with the two lens apertures, the two picture windows and the slot through which the film strip is moved inwardly and outwardly from the body of the viewing device.

5. As an article of manufacture, a stereoscopic viewing device constructed of die-cut cardboard foldable from a flat sheet so as to form a box-shaped structure, spacer elements bonded to said structure in such position as to form two viewing tunnels therein and to impart rigidity and resistance to torsional deflection thereto, said box-shaped structure containing two lens apertures, four picture apertures and two window apertures registering in a line of sight through said two viewing tunnels, slotted means for engaging nesting ridges formed on folded panels of said structure whereby are formed a long narrow channel and a shorter wider channel running longitudinally and consecutively through the center of said structure and at right angles to said viewing tunnels, the left side of said structure bonded so as to close the outer end of said shorter wider channel and the right side of said structure bonded to form an open slot aligned with the outer end of said long narrow channel, a translucent material bonded to cover said two picture windows, a lens mount bonded to said structure in alignment with said lens apertures so as to form a grooved seat for mounting of said lenses, a transparency film strip bearing two successive series of stereoscopic images and having movement stopping means at one end being inserted into said two channels, the end of said film strip with stopping means being seated in the shorter wider channel and the remainder of the film strip seated in the long narrow channel, two lenses inserted into the two lens mounts having grooved seats therefor, said lenses and said film strip thus being inserted into the device at an advanced stage in the assembly of said device so as to minimize the possibility of damaging said film strip and lenses during the series of preceding assembly operations, a rectangular cardboard cover bonded over the entire top of said device to form a complete enclosure thereof, a printed cover paper then bonded over the entire outer surface of said device, said cover paper containing matching cut-outs to coincide with the two lens apertures, the two picture windows and the slot through which said film strip is moved inwardly and outwardly from the body of the viewing device.

JOHN NELSON WILLIAMS.

References Cited in the file of this patent

UNITED STATES PATENTS

| Number | Name | Date |
|---|---|---|
| 1,956,938 | Wood et al. | May 1, 1934 |
| 2,071,120 | Harlow | Feb. 16, 1937 |
| 2,122,649 | Kahn | July 5, 1938 |
| 2,368,480 | McClure | Jan. 30, 1945 |

FOREIGN PATENTS

| Number | Country | Date |
|---|---|---|
| 371,274 | Germany | Mar. 13, 1923 |
| 668,950 | France | July 23, 1929 |
| 675,940 | France | Nov. 18, 1929 |
| 710,240 | Germany | Sept. 8, 1941 |